US010520918B2

(12) United States Patent
Shen et al.

(10) Patent No.: US 10,520,918 B2
(45) Date of Patent: Dec. 31, 2019

(54) PROGRAMMING AND MONITORING A NEWLY-INSTALLED SENSOR ON A MOTOR VEHICLE

(71) Applicant: Doran Manufacturing, LLC, Cincinnati, OH (US)

(72) Inventors: Jie Kevin Shen, Shanghai (CN); Jeffrey Stegman, Cincinnati, OH (US); Lee Anthony Demis, Cincinnati, OH (US); James Clifford Samocki, Cincinnati, OH (US)

(73) Assignee: Doran Manufacturing, LLC, Cincinnati, OH (US)

( * ) Notice: Subject to any disclaimer, the term of this patent is extended or adjusted under 35 U.S.C. 154(b) by 142 days.

(21) Appl. No.: 15/279,619

(22) Filed: Sep. 29, 2016

(65) Prior Publication Data

US 2018/0088556 A1 Mar. 29, 2018

Related U.S. Application Data

(60) Provisional application No. 62/234,265, filed on Sep. 29, 2015.

(51) Int. Cl.
*G05B 19/4093* (2006.01)

(52) U.S. Cl.
CPC ............... *G05B 19/4093* (2013.01); *G05B 2219/31379* (2013.01); *Y02P 90/265* (2015.11)

(58) Field of Classification Search
CPC ............................................. G05B 19/4093

(Continued)

(56) References Cited

U.S. PATENT DOCUMENTS 5,583,844 A * 12/1996 Wolf .................. A63G 31/16
472/43
5,648,898 A * 7/1997 Moore-McKee ............
G05B 19/0426
700/86

(Continued)

OTHER PUBLICATIONS

Gong, Qiuming, Yaoyu Li, and Zhong-Ren Peng. "Trip based power management of plug-in hybrid electric vehicle with two-scale dynamic programming." Vehicle Power and Propulsion Conference, 2007. VPPC 2007. IEEE. IEEE, 2007. pp. 12-19 (Year: 2007).*

(Continued)

*Primary Examiner* — Satish Rampuria
(74) *Attorney, Agent, or Firm* — Dinsmore & Shohl LLP

(57) ABSTRACT

Disclosed herein is a method of programming a monitor to process data from a new sensor having a selected location on a vehicle, where in the new sensor transmits a verification code and an identification code as well as said data. The subject monitor programming method basically comprises initiating a programming mode, entering the location of the new sensor, entering a subset of the new sensor's identification code; storing the location and subset, exiting the programming mode, initiating a verification mode, receiving the new sensor's verification code and identification code, recognizing the verification code, storing the identification code, exiting the verification mode, initiating a normal operation and display mode, comparing the new sensor's transmitted identification code with the stored identification code, and processing the data from the new sensor when the transmitted identification code matches the stored identification code.

3 Claims, 1 Drawing Sheet

(58) Field of Classification Search
USPC .............................. 700/86–114; 340/438–454
See application file for complete search history.

(56) References Cited

U.S. PATENT DOCUMENTS

| | | | | | |
|---|---|---|---|---|---|
| 6,100,811 | A | * | 8/2000 | Hsu | B60H 1/00642 340/426.36 |
| 6,236,910 | B1 | * | 5/2001 | Iwai | F02D 41/26 123/480 |
| 6,271,745 | B1 | * | 8/2001 | Anzai | G07C 9/00158 340/5.23 |
| 6,693,522 | B2 | * | 2/2004 | Tang | B60C 23/0416 340/442 |
| 6,823,244 | B2 | * | 11/2004 | Breed | B60N 2/0232 701/29.7 |
| 6,868,170 | B1 | * | 3/2005 | Fuku | G07C 9/00563 340/5.53 |
| 7,688,192 | B2 | * | 3/2010 | Kenny | B60C 23/0408 340/447 |
| 8,781,669 | B1 | * | 7/2014 | Teller | G05D 1/021 700/245 |
| 9,393,845 | B2 | * | 7/2016 | Lammers | B60C 23/0461 |
| 2004/0069580 | A1 | * | 4/2004 | Fleming | B60T 7/045 188/265 |
| 2009/0121856 | A1 | * | 5/2009 | Stegman | B60C 23/0408 340/442 |
| 2014/0165026 | A1 | * | 6/2014 | McIntyre | B60C 23/0471 717/100 |
| 2016/0039256 | A1 | * | 2/2016 | Lammers | B60C 23/0461 701/29.7 |

OTHER PUBLICATIONS

Suzuki, Shooji, and Shigeki Iida. "Implementation of a small size experimental self-contained autonomous robot—sensors, vehicle control, and description of sensor based behavior." Experimental Robotics II. Springer, Berlin, Heidelberg, 1993. pp. 344-358. (Year: 1993).*

Coué, Christophe, et al. "Multi-sensor data fusion using Bayesian programming: an automotive application." Intelligent Vehicle Symposium, 2002. IEEE. vol. 2. IEEE, 2002.pp. 442-447 (Year: 2002).*

Xiong, Lu, and Zhuoping Yu. "Control allocation of vehicle dynamics control for a 4 in-wheel-motored EV." 2009 2nd International Conference on Power Electronics and Intelligent Transportation System (PEITS). vol. 2. IEEE, 2009.pp. 307-311 (Year: 2009).*

Kowalewski, Marcin. "Monitoring and managing tire pressure." IEEE Potentials 23.3 (2004): pp. 8-10. (Year: 2004).*

Pohl, Alfred, Reinhard Steindl, and Leonhard Reindl. "The "intelligent tire" utilizing passive SAW sensors measurement of tire friction." IEEE transactions on instrumentation and measurement 48.6 (1999): pp. 1041-1046. (Year: 1999).*

* cited by examiner

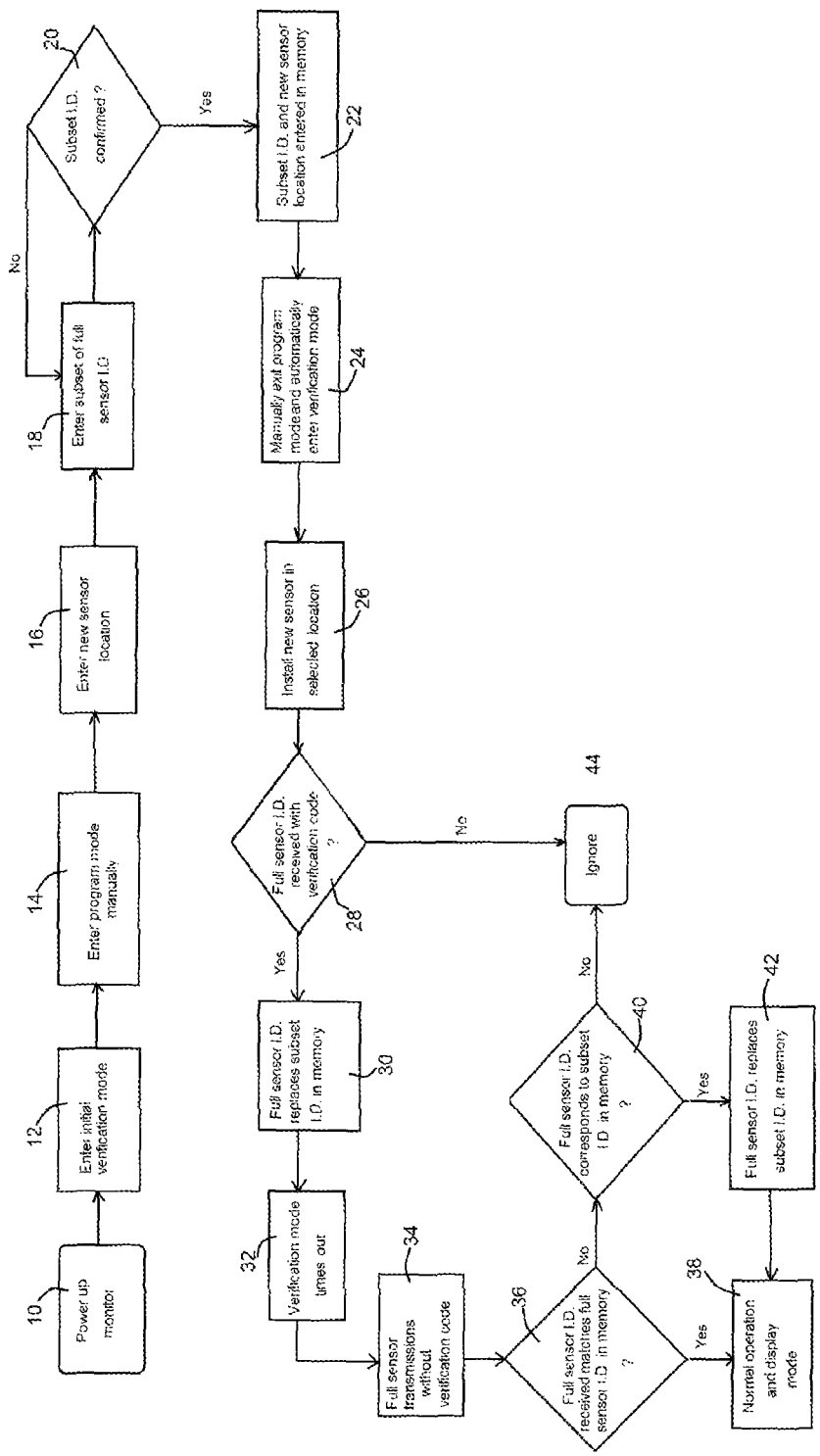

PROGRAMMING AND MONITORING A NEWLY-INSTALLED SENSOR ON A MOTOR VEHICLE

RELATED APPLICATION

The present non-provisional application is based upon and claims the priority of U.S. Provisional Application No. 62/234,265 filed Sep. 29, 2015.

TECHNICAL FIELD

The present invention relates to electronic apparatus for sensing and monitoring one or more conditions, such as tire pressure, on a motor vehicle, and more particularly to a method for programming the monitor to accept signals from a newly installed sensor.

BACKGROUND ART

U.S. Pat. No. 7,940,164 discloses a method of programming a monitor to receive and process signals from a new sensor. This method basically comprises entering the tire location of the new sensor, entering a subset of the new sensor's full identification code, receiving the full identification code from the sensor, comparing the subset with the full identification codes, and storing the full identification code if it corresponds to the subset.

The problem with this method was cross talk, where the monitor was within range of signals from other sensors and mistook the identification code of another sensor for that of the newly installed one. The present improvement eliminates or at least reduces the cross talk problem by programming the monitor to act upon a verification code transmitted briefly by the new sensor, as described more fully herein.

SUMMARY

Disclosed herein is a method of programming a monitor to process data from a new sensor having a selected location on a vehicle, where in the new sensor transmits a verification code and an identification code as well as said data. The subject monitor programming method basically comprises initiating a programming mode, entering the location of the new sensor, entering a subset of the new sensor's identification code; storing the location and subset, exiting the programming mode, initiating a verification mode, receiving the new sensor's verification code and identification code, recognizing the verification code, storing the identification code, exiting the verification mode, initiating a normal operation and display mode, comparing the new sensor's transmitted identification code with the stored identification code, and processing the data from the new sensor when the transmitted identification code matches the stored identification code.

DRAWINGS

FIG. 1 is a diagrammatic view of the present method.

DESCRIPTION OF ILLUSTRATIVE EMBODIMENT

As illustrated in FIG. 1, the following steps may be taken to program a monitor to process readings from a newly installed sensor. First the monitor is turned on 10, by starting the vehicle in which it is installed and/or by separately powering it up. Once operative, the monitor may automatically enter a verification mode 12. The monitor may then be manually switched to a programming mode 14, in one phase of which the operator is prompted to enter the location of the new sensor 16. After doing so, the operator is prompted to enter a portion or subset 18 of an alphanumeric identification code that the sensor transmits at intervals with the data it is designed to provide. The monitor may prompt the operator to confirm the accuracy of the location and subset identification entries 20 and, once confirmed, enter these parameters in memory 22.

Upon manually leaving the programming mode, the monitor may automatically enter a verification mode 24, and the new sensor is installed in the selected location 26. The new sensor transmits a verification code upon installation for a brief period of time, such as two minutes. In addition, the sensor transmits its full identification code. While in the verification mode, the monitor is programmed to receive and retain the full identification code from the new sensor 28. If the monitor has received the verification and identification codes from the new sensor, it determines whether the full identification corresponds with the subset identification stored in memory. If there is such correspondence, the full identification code replaces the subset in memory 30. During the verification mode, the monitor will not accept identification codes from sensors that are not transmitting the verification code. Once the sensor's verification code times out 32, it transmits its identification code and readings 34 without the verification code.

After a period of time which may correspond with the termination of the verification code transmission from the new sensor, the monitor times out of its verification mode and enters normal display and operating mode. In this mode, the monitor compares identification codes transmitted by the sensors with full sensor identifications it may have stored in memory 36. If there are matches, the monitor processes and displays the sensor data accompanying the accepted sensor identifications 38. If the transmitted sensor identification does not match the full identification in memory, the monitor compares the transmitted identification with any subset identifications in memory 40. If correspondence is found, the full identification replaces the subset in memory 42 and the monitor accepts and displays the sensor data 38. If no correspondence is found, the monitor ignores the sensor transmission 44.

In the foregoing manner, the present method is designed to eliminate or at least reduce the chances that the monitor will mistakenly process data from another sensing device that is transmitting signals within range.

The invention claimed is:

1. In a method of integrating a sensor being newly installed on a selected tire in a monitoring system for a motor vehicle having a multiplicity of tires and sensors, wherein each of the sensors transmits an identification code and tire condition information to a monitor for processing and display, that improvement which comprises:
 a) entering a portion of the identification code of the sensor being newly installed and a location of the selected tire into the monitor;
 b) entering a verification mode in the monitor after said portion of the identification code and the tire location have been entered, wherein the monitor enters the verification mode automatically after the portion of the identification code and the tire location have been entered;
 c) installing the sensor on the selected tire;

d) generating and transmitting a verification code with the newly installed sensor for a limited period of time initiated upon installation of the sensor such that during the verification mode the monitor will not accept identification codes from sensors that are not transmitting the verification code;

e) receiving said verification code with the monitor during the limited period of time initiated upon installation of the sensor; and f) processing the identification code and the tire condition information from the newly installed sensor with the monitor after the verification code is received during the limited period of time initiated upon installation of the sensor.

2. The method according to claim 1, wherein the limited period of time during which the newly installed sensor generates and transmits the verification code is two minutes.

3. The method according to claim 1, wherein the monitor times out of the verification mode and enters a normal operating mode after a period of time.

* * * * *